United States Patent
Morgan

(10) Patent No.: US 11,713,001 B2
(45) Date of Patent: Aug. 1, 2023

(54) CONSOLE MOUNTED ARTICLE HOLDING ASSEMBLY

(71) Applicant: Donna Morgan, Sadler, TX (US)

(72) Inventor: Donna Morgan, Sadler, TX (US)

(*) Notice: Subject to any disclaimer, the term of this patent is extended or adjusted under 35 U.S.C. 154(b) by 607 days.

(21) Appl. No.: 15/931,136

(22) Filed: May 13, 2020

(65) Prior Publication Data
US 2021/0354631 A1 Nov. 18, 2021

(51) Int. Cl.
*B60R 7/08* (2006.01)

(52) U.S. Cl.
CPC .................................. *B60R 7/08* (2013.01)

(58) Field of Classification Search
CPC .. B60R 7/08; B60R 7/043; B60R 7/04; B60R 7/10; B60R 2011/0007; B60R 2011/0082; B60N 3/026
USPC ............ 296/24.34, 37.8, 1.07; 24/302, 265 h
See application file for complete search history.

(56) References Cited

U.S. PATENT DOCUMENTS

| | | | |
|---|---|---|---|
| 1,696,029 A * | 12/1928 | Chandler | B60R 7/08 224/563 |
| 2,455,237 A * | 11/1948 | Davis | B60P 7/0876 410/97 |
| 4,756,498 A * | 7/1988 | Frye | F16B 47/003 248/467 |
| 5,330,251 A * | 7/1994 | McGuire | B60R 7/08 160/370.22 |
| D447,656 S | 9/2001 | Richter | |
| 6,651,941 B1 | 11/2003 | Kinsel | |
| 6,923,356 B2 | 8/2005 | Reynolds | |
| 8,360,519 B1 | 1/2013 | Hsu | |
| 9,481,309 B2 | 11/2016 | Sakarian | |
| 9,539,949 B2 | 1/2017 | Nuako | |
| 10,214,149 B2 | 2/2019 | Nolan | |
| 2018/0118120 A1* | 5/2018 | Ferreira Orta | B60R 7/04 |
| 2021/0129735 A1* | 5/2021 | Kokoksy | B60R 7/08 |

FOREIGN PATENT DOCUMENTS

WO WO2017119892 7/2017

* cited by examiner

*Primary Examiner* — Stephen T Gordon

(57) ABSTRACT

A console mounted article holding assembly includes a console including a perimeter wall has an upper edge defining an opening extending into the console. A lid is pivotally attached to the perimeter wall and is positionable in a closed position closing the opening or in an open position exposing the opening. A panel is flexible and has a first side, a second side and a perimeter edge. The perimeter edge includes a top edge, a bottom edge, a first lateral edge and a second lateral edge. The upper edge extends through the opening such that the bottom edge is positioned outside of the console and extends downwardly from the perimeter wall. At least one hook is attached to the flexible panel and extends downwardly from the bottom edge. A coupler releasably attaches the second side of the panel to an interior surface of the console.

7 Claims, 6 Drawing Sheets

CONSOLE MOUNTED ARTICLE HOLDING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to article holding and storage device and more particularly pertains to a new article holding and storage device for providing a located to secure and hold personal articles such as purses, shopping bags and the like to the side of a console and adjacent to a vehicle seat.

(2) Description of Related Art Including Information Disclosed Under 37 CFR 1.97 and 1.98

The prior art relates to article holding and storage devices that are used within a vehicle to secure articles therein.

BRIEF SUMMARY OF THE INVENTION

An embodiment of the disclosure meets the needs presented above by generally comprising a console including a perimeter wall has an upper edge defining an opening extending into the console. A lid is pivotally attached to the perimeter wall and is positionable in a closed position closing the opening or in an open position exposing the opening. A panel is flexible and has a first side, a second side and a perimeter edge. The perimeter edge includes a top edge, a bottom edge, a first lateral edge and a second lateral edge. The upper edge extends through the opening such that the bottom edge is positioned outside of the console and extends downwardly from the perimeter wall. At least one hook is attached to the flexible panel and extends downwardly from the bottom edge. A coupler releasably attaches the second side of the panel to an interior surface of the console.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
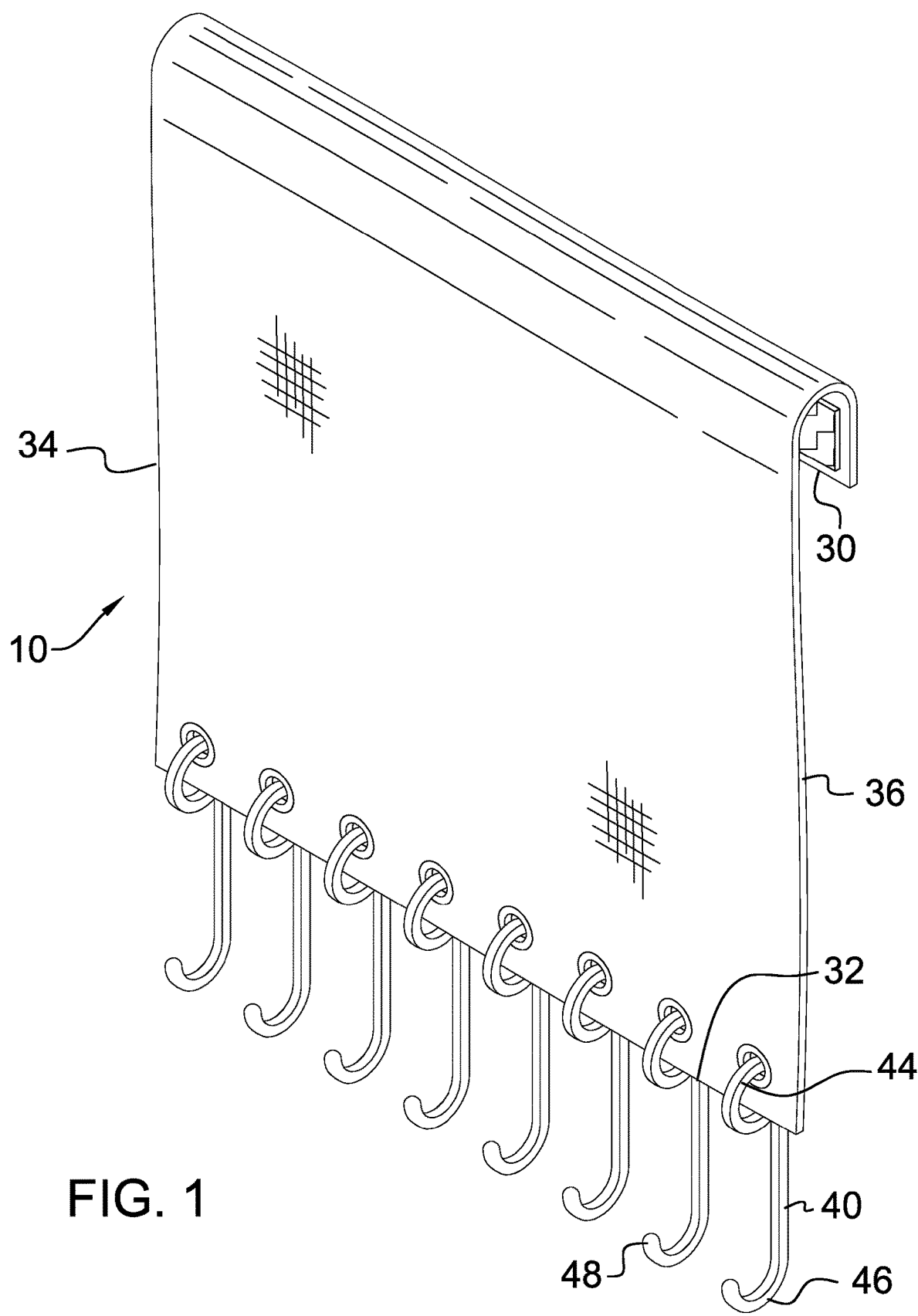
FIG. 1 is a front isometric view of a console mounted article holding assembly according to an embodiment of the disclosure.
Figure 2:
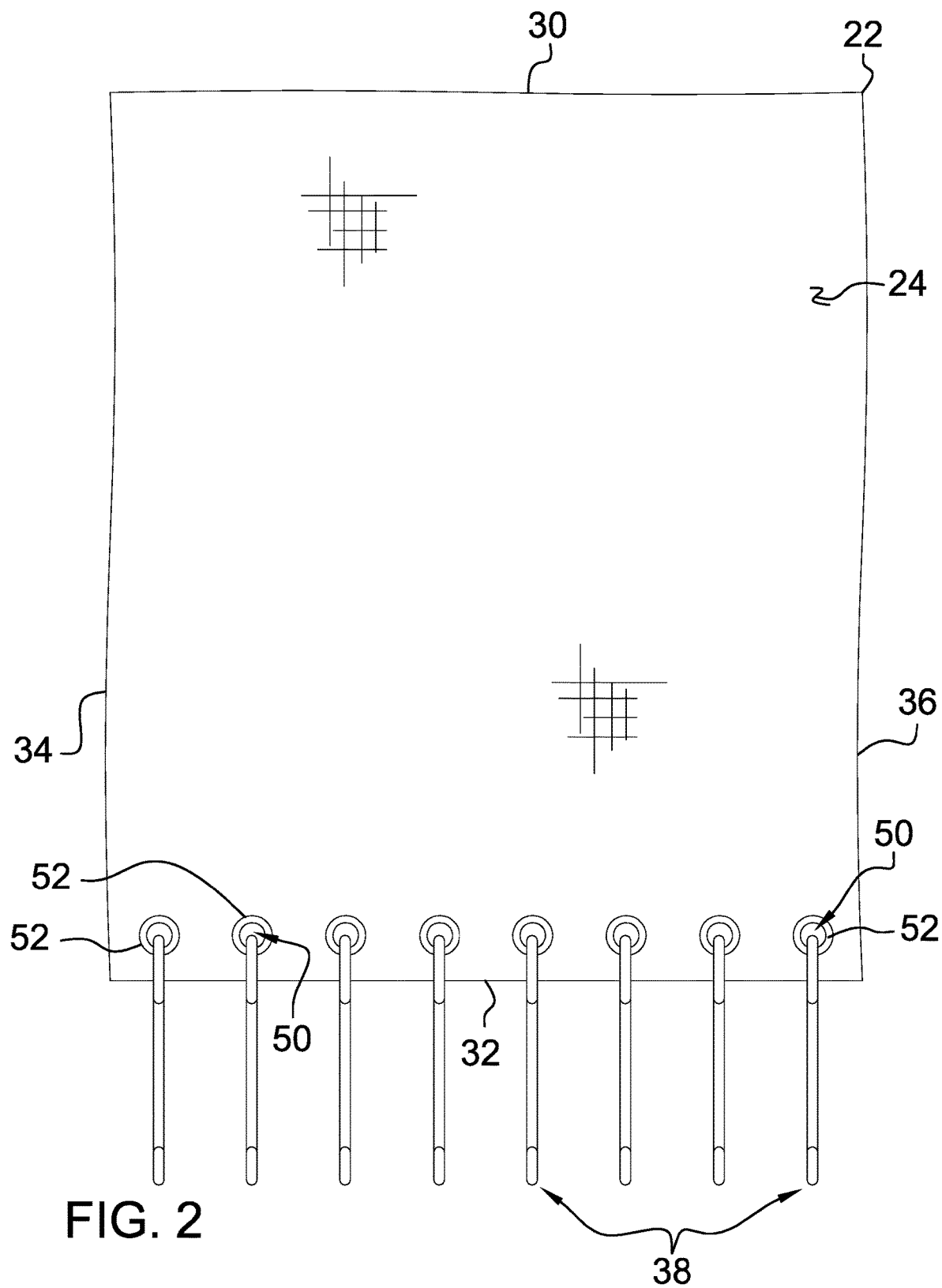
FIG. 2 is a front view of an embodiment of the disclosure.
Figure 3:
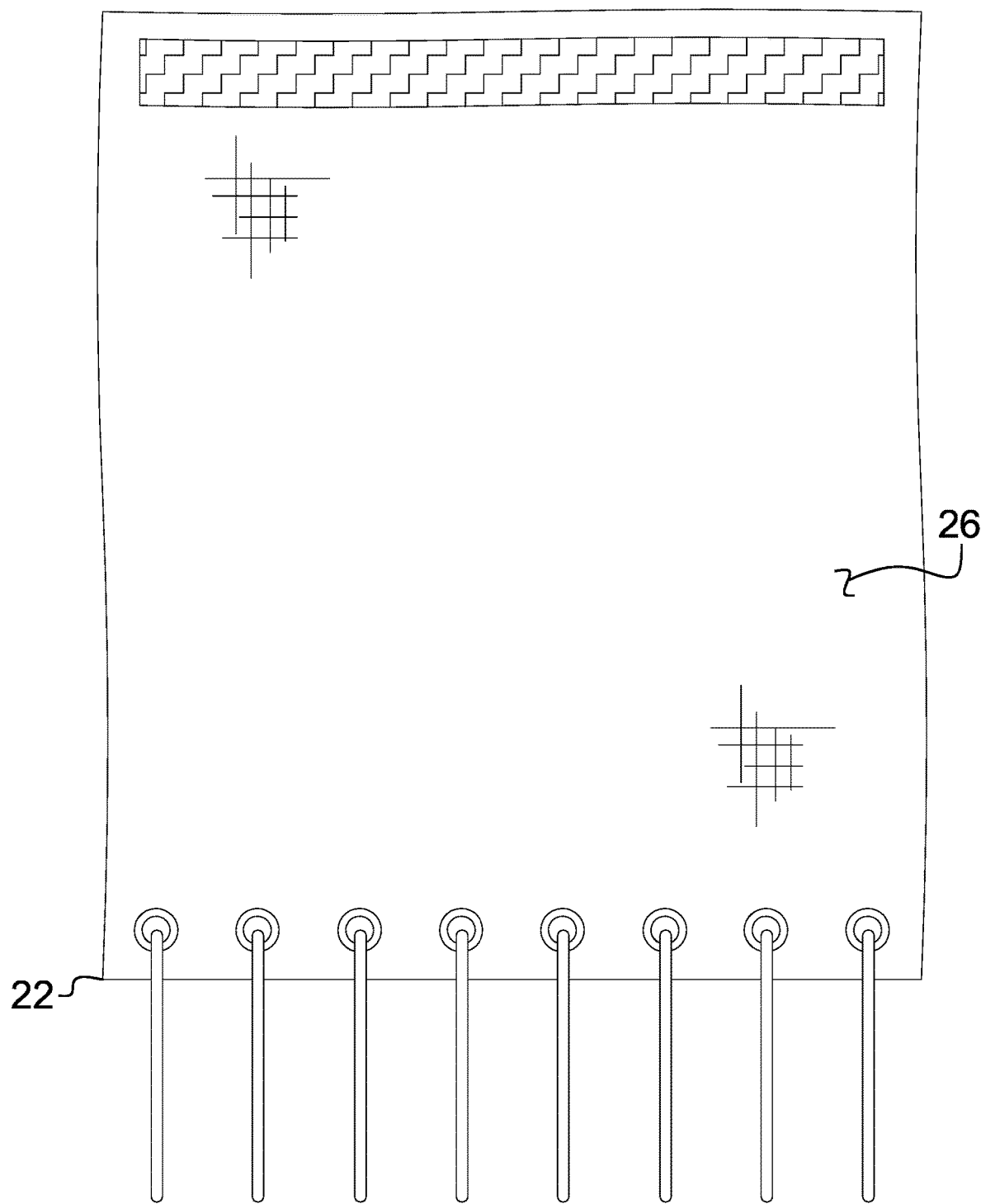
FIG. 3 is a rear view of an embodiment of the disclosure.
Figure 4:
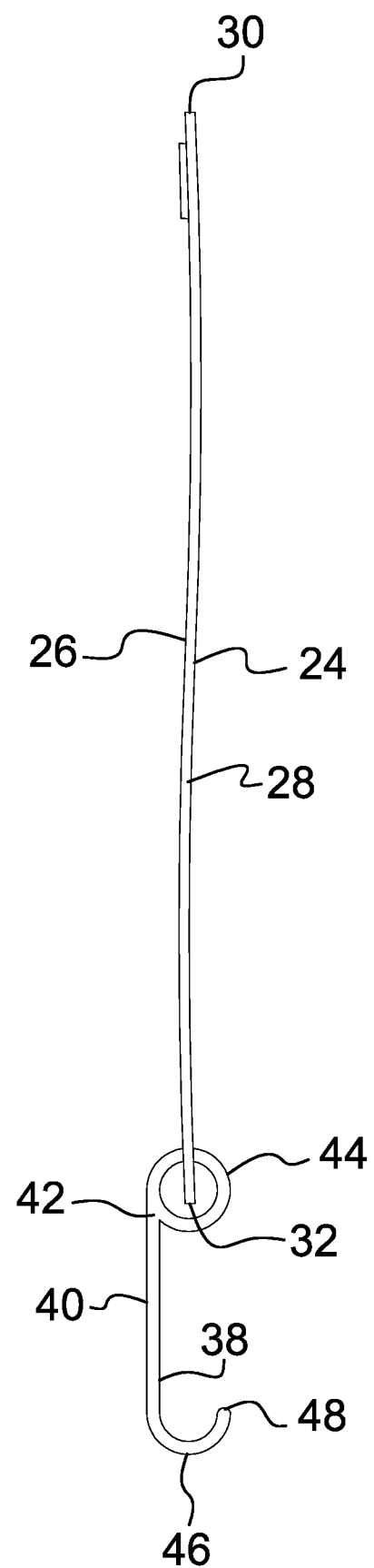
FIG. 4 is a side view of an embodiment of the disclosure.

With reference now to the drawings, and in particular to FIGS. 1 through 6 thereof, a new article holding and storage device embodying the principles and concepts of an embodiment of the disclosure and generally designated by the reference numeral 10 will be described.

As best illustrated in FIGS. 1 through 6, the console mounted article holding assembly 10 generally comprises a console 12 including a perimeter wall 14 having an upper edge 16 defining an opening 18 extending into the console 12. A lid 20 is pivotally attached to the perimeter wall 14 and is positionable in a closed position closing the opening 18 or in an open position exposing the opening 18. The console 12 is a conventional vehicle console that is positioned adjacent to a vehicle seat 21 and particularly positioned between the front seats of the vehicle.

A panel 22 is flexible and has a first side 24, a second side 26 and a perimeter edge 28. The perimeter edge 28 includes a top edge 30, a bottom edge 32, a first lateral edge 34 and a second lateral edge 36. The panel 22 may be comprised of a flexible plastic material, an elastomeric material or a cloth material. The top edge extends through the opening 18 such that the bottom edge 32 is positioned outside of the console 12 and extends downwardly from the upper edge 16 of the perimeter wall 14. The lid 20 may be closed on the panel 22 to help retain the panel 22 in place. While the panel 22 may have any useful dimensions, most typically the panel 22 has a height and length that may each be between 6.0 inches and 9.0 inches.

Figure 5:
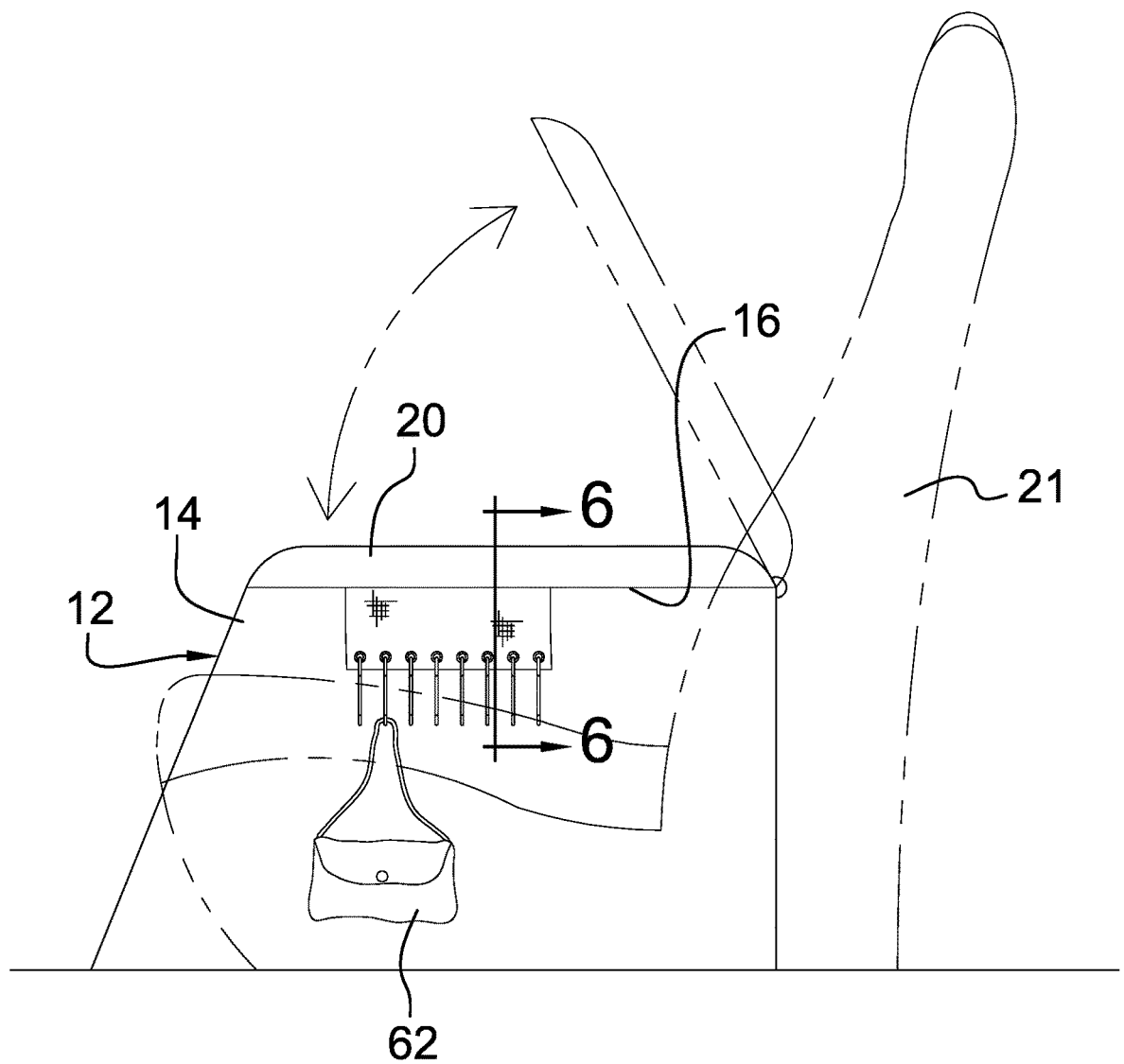
FIG. 5 is a front in-use view of an embodiment of the disclosure.
Figure 6:
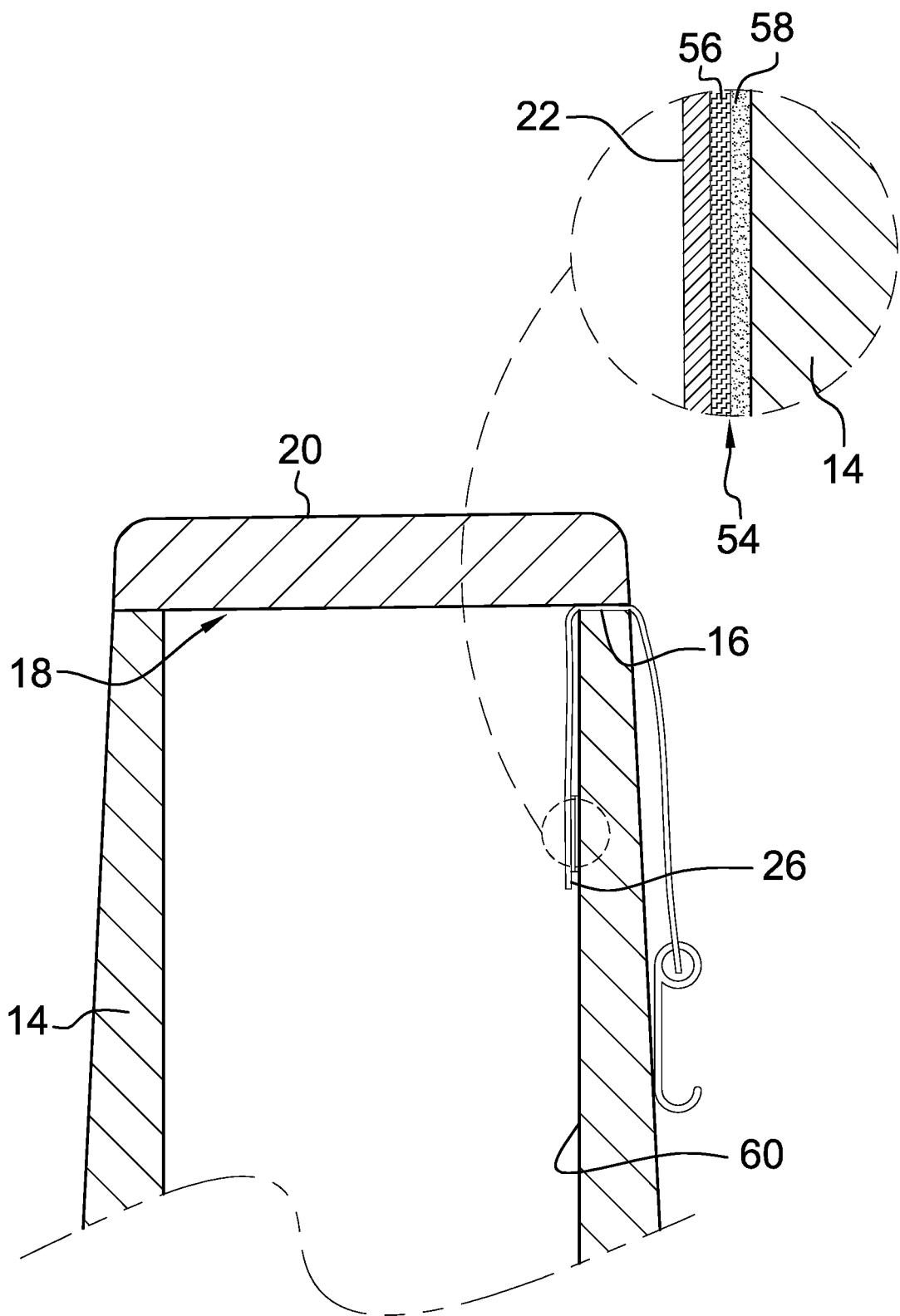
FIG. 6 is a cross-section view of an embodiment of the disclosure taken along line 6-6 of FIG. 5.

At least one hook 38 is attached to the flexible panel 22 and extends downwardly from the bottom edge 32. The at least one hook 38 includes a leg 40 having a top end 42 that is attached to the panel 22. The top end 42 may comprise a closed loop 44 wherein the closed loop 44 extends through panel 22 and around the bottom edge 32. An arm 46 is attached to a bottom end of the leg 40. The arm 46 is U-shaped and has a distal end 48 with respect to leg 40, and the distal end 48 extends upwardly when the top edge 30 is positioned in the console 12 as shown in FIG. 5.

In most embodiments, the at least one hook 38 comprises a plurality of hooks 38. The plurality of hooks 38 includes at least four hooks 38 and no more than ten hooks 38. The panel 22 has a plurality of apertures 50 extending therethrough and each of the apertures 50 is reinforced with a grommet 52. The closed loops 44 each extend through one of the apertures 50. The hooks 38 may be comprised of a rigid material or may include resiliently flexible sections to allow the hooks 52 to be more easily manipulated.

A coupler 54 releasably attaches the second side 26 of the panel 22 to an interior surface 60 of the console 12. The coupler 54 includes a first mating member 56 attached to the second side 26 adjacent to the upper edge 30 and a second mating member 58 is attached to the interior surface 60 of the console 12. The first 56 and second 58 mating members are removably engaged with each other. The coupler 54 may comprise a hook and loop coupler wherein the second mating member 58 is attached to the interior surface 60 with an adhesive.

In use, the panel 22 is placed in the console 12 and secured thereto with the coupler 54 such that the panel 22 extends over the upper edge 16 and down a side of the console 14. The hooks 38 are then utilized for holding various articles such as, for example, small handbags 62. Other containers or bags having handles may also be attached to the hooks 38.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An article holding system for holding articles adjacent to a vehicle seat, the system including:
   a console including a perimeter wall having an upper edge defining an opening extending into the console;
   a lid being pivotally attached to the perimeter wall, the lid being positionable in a closed position closing the opening or in an open position exposing the opening;
   a panel being flexible and having a first side, a second side and a perimeter edge, the perimeter edge including a top edge, a bottom edge, a first lateral edge and a second lateral edge, the top edge extending through the opening such that the bottom edge is positioned outside of the console and extends downwardly from the upper edge of the perimeter wall;
   at least one hook being attached to the flexible panel and extending downwardly from the bottom edge; and
   a coupler releasably attaching the second side of the panel to an interior surface of the console.

2. The article holding system according to claim 1, wherein the at least one hook includes:
   a leg having a top end being attached to the panel, the top end comprising a closed loop, the closed loop extending through the panel and around the bottom edge; and
   an arm being attached to a bottom end of the leg, the arm being U-shaped and having a distal end with respect to leg, the distal end extending upwardly.

3. The article holding system according to claim 2, wherein the at least one hook comprises a plurality of hooks, the plurality of hooks including at least four hooks and no more than ten hooks.

4. The article holding system according to claim 3, wherein the panel has a plurality of apertures extending therethrough, the apertures each being reinforced with a grommet, each of the closed loops extending through one of the apertures.

5. The article holding system according to claim 1, wherein the coupler includes a first mating member being attached to the second side adjacent to the upper edge, a second mating member being attached to the interior surface of the console, the first and second mating members are removably engaged with each other.

6. The article holding system according to claim 5, wherein the coupler comprises a hook and loop coupler.

7. An article holding system for holding articles adjacent to a vehicle seat, the system including:
   a console including a perimeter wall having an upper edge defining an opening extending into the console;
   a lid being pivotally attached to the perimeter wall, the lid being positionable in a closed position closing the opening or in an open position exposing the opening;
   a panel being flexible and having a first side, a second side and a perimeter edge, the perimeter edge including a top edge, a bottom edge, a first lateral edge and a second lateral edge, the top edge extending through the opening such that the bottom edge is positioned outside of the console and extends downwardly from the upper edge of the perimeter wall;
   at least one hook being attached to the flexible panel and extending downwardly from the bottom edge, the at least one hook including:
      a leg having a top end being attached to the panel, the top end comprising a closed loop, the closed loop extending through the panel and around the bottom edge;
      an arm being attached to a bottom end of the leg, the arm being U-shaped and having a distal end with respect to leg, the distal end extending upwardly;
   the at least one hook comprising a plurality of hooks, the plurality of hooks including at least four hooks and no more than ten hooks;
   the panel having a plurality of apertures extending therethrough, the apertures each being reinforced with a grommet, each of the closed loops extending through one of the apertures; and
   a coupler releasably attaching the second side of the panel to an interior surface of the console, the coupler including a first mating member being attached to the second side adjacent to the upper edge, a second mating member being attached to the interior surface of the console, the first and second mating members being removably engaged with each other, the coupler comprising a hook and loop coupler.

\* \* \* \* \*